United States Patent Office 3,391,738
Patented July 9, 1968

3,391,738
CONSOLIDATING INCOMPETENT WATER-CON-
TAINING SUBTERRANEAN FORMATIONS
Derry D. Sparlin, Ponca City, Okla., assignor to Continental Oil Company, Ponca City, Okla., a corporation of Delaware
No Drawing. Filed Nov. 5, 1965, Ser. No. 506,607
13 Claims. (Cl. 166—33)

ABSTRACT OF THE DISCLOSURE

Method of treating a well penetrating an incompetent sand formation containing water comprising injecting into said well a suspension of a liquid thermoplastic resin, with or without particulated solids, in a resin protective agent liquid, said resin protective agent being an oil having substantial aromatic content and having a density so related to the density of the thermoplastic resin or thermoplastic resin-coated particulated solids so that water will not separate the resin protective agent from the thermoplastic resin, and allowing the resin to set to form a fluid premeable mass.

---

This invention relates to a method of consolidating loose or incompetent subterranean formations employing a resinous composition as a consolidating agent. More particularly, this invention relates to such a process wherein said subterranean formation contains water or brine.

In the production of subterranean fluids, such as oil, gas, water, etc. via wells, a number of difficulties are encountered when the producing formation is loosely or poorly consolidated. Particles of such formations, usually sand grains, become entrained in the fluid being produced and are carried into the wellbore. The result of such entrainment, among other things, is the abrasion of the pumping equipment in the wellbore, the clogging of strainers and the sanding in of the cavity immediately adjacent the strainer. These results, in turn, ultimately cause a sharp decrease in the rate of production and/or high maintenance costs.

In an effort to reduce the deleterious results generally associated with producing fluids from an unconsolidated formation, it has become the practice to form a fluid permeable formation particle impermeable barrier in the formation surrounding the wellbore which prevents the loose sand particles or detritus from being carried into the wellbore, but allows the passage of fluids. This barrier may be formed by any of three approaches. In one approach a fluid cementing material, usually a liquid thermosetting plastic, is forced into the formation where it contacts the loose grains or particles in the formation and bonds them together when the plastic sets or solidifies. This reduces the mobility of the grains thus bonded together and also those loose grains further out in the formation which cannot pass through the consolidated mass. Fluid permeability of the system is achieved by using a plastic that shrinks when it sets, as a plastic which contains a volatile constituent such as an alcohol and/or overflushing the plastic prior to set with an organic liquid which flushes out most of the plastic from the interstices between the sand grains but leaves a coating of plastic around each grain capable of bonding said grains together. A second procedure involves creating a void surrounding the wellbore if no void already exists. The void is then filled with plastic coated particulate solids, pumped into the well as a slurry, suspended in a carrying liquid. The plastic is allowed to set to form a porous monolithic mass which excludes passage therethrough of any surrounding loose formation sand. A third procedure involves pressuring a slurry of plastic coated particulated solids into a formation without first creating a cavity. Many formations are mobile enough so that they may be pushed back somewhat to accommodate such a slurry without first creating a void space.

In each of the above-described procedures difficulties are encountered in forming a barrier where the formation to be treated or surrounding the void contains water. Water interferes with wetting of sand grains by the plastic and thus reduces the resulting bond strength. Water intermixing with the plastic interferes with the set of the plastic to either prevent a bond from being formed altogether or allow formation of only a relatively weak bond. Water also dilutes the plastic so that it will not polymerize. It has been the past practice to displace water from the formation prior to a plastic treatment by flushing the formation with oil or an organic solvent miscible with water, such as a lower alkyl alcohol. If large amounts of water are present, a large costly volume of flush will be required. More important, an ideal flush is seldom achieved. Generally, the flush liquid will tend to channel or finger through the formation leaving some water in or immediately adjacent the area into which plastic or plastic coated sand is to be placed. When the well is shut in after placement of the plastic to allow the same to set, water will encroach into and contaminate the plastic resulting in a poor set or no set. Water also is often intentionally injected into a wellbore during treatment of the formation to kill the well, i.e., provide a heavy fluid column to overcome the pressure of fluid in the formation. In such cases, the high density water fills the wellbore below any perforations or other point of entry into the formation. This water is not displaced by an organic flush. However, when the high density slurry of plastic coated particulated solids is pumped into the wellbore, it will fall through the lighter water to the bottom of the borehole, thus displacing upwardly a portion of the water which rises and contacts the formation.

Accordingly, it is an object of this invention to provide an improved, fluid permeable barrier to prevent production of poorly or loosely consolidated subterranean formation rock from wells. It is a further object to provide improved compositions and methods useful in well treating operations wherein resin coatings are provided or formed on the surfaces of structures introduced or present in the well or surrounding strata. It is a still further object to consolidate loose or incompetent formations with a thermosetting resin to provide an improved bond between the resinous material and the grains of material composing the formation. It is another object to provide improved sand control compositions and methods involving the placement in a well of a resin-containing composition or resin-coated granular or particulated solids to reduce or prevent the migration of loose sand or the like. It is an additional object to carry out any and all of the foregoing objects when the formation rock surrounding the well is saturated with water. These and related objects, advantages and features will become more readily apparent from the following detailed description and discussion.

In brief, this invention comprises treating a well penetrating an incompetent subterranean formation which contains water to create a fluid permeable barrier by injecting into the wellbore area or surrounding formation a dispersion of a liquid thermoplastic resin in a resin protective agent. The dispersion may or may not also contain a solid particulate material. After the resin has set or solidified, the well is ready for use. Shifting or movement of the loose formation detritus is decreased by the fluid permeable barrier created by the plastic.

The resin protective agent minimizes or reduces the deleterious effect of water on the plastic by essentially preventing water from contacting the plastic. The liquid resin is not appreciably soluble in the resin protective agent, but is readily dispersible therein to form a two-phase system having low interfacial tension. It is preferred that the resin protective agent be free of amphoteric material, such as a buffer, ion exchange resin, or clay, and colloidal suspended matter, such as soap gelling agents, e.g., neutralization product of a tall oil fatty acid and an alkali metal hydroxide.

The resin protective agent should be used in an amount at least equal to the amount of plastic employed. It is preferred to use an excess of resin protective agent, up to about 10 times or greater the amount of resin employed. In many field trials a ratio of 60 parts by weight resin to 400 parts resin protective agent has been employed.

The solid particulate materials used to form a fluid permeable barrier in one form of this invention are well known in the art. Most often used are sand and walnut hulls in a U.S. Standard mesh size between 10 and 100. Other materials which may be used include other nut shells, peach pits, brittle synthetic resins, gilsonite, coke and similar solid materials.

In general, any thermosetting resin may be used in carrying out this invention. Specific examples of resin types are the polyepoxides; hydroxy aryl-aldehyde; such as phenol - formaldehyde; urea - formaldehyde; melamine-formaldehyde; acrylic-type prepared from methyl methacrylate, ethylacrylate, n-butyl methacrylate, isobutyl methacrylate, ethyl methacrylate and similar esters, alone or in combination with other momomers; vinyl polymers prepared from vinyl chloride, vinyl acetate, polyvinyl alcohol, polyvinyl acetal, polyvinyl butyral, polyvinyl formal, vinylidene chloride and the like; allyl resins, such as allyl diglycol carbonate; glyceryl phthalate and similar alkyl resins; polyester resins prepared by the co-polymerization of a dihydrid alcohol, such as ethylene glycol, an unsaturated dibasic acid, such as fumaric acid and an unsaturated monomer, such as styrene or the like; polyurethane derived from polyisocyanates, such as toluene diisocyanate and polyols, including glycols, polyesters and polyethers; silicones produced by the hydrolysis and condensation of organosilanehalide intermediates; styrene polymer and copolymer. Formulation of each of these resins is well known in the art and does not constitute a part of this invention.

The polyepoxides used comprise those organic materials possessing more than one epoxy group. Examples of the polyepoxides includes 1,4-bis(2,3-epoxypropoxy) benzene, 1,3-bis(2,3-epoxypropoxy) benzene, 1,4'-bis(2,3-epoxypropoxy) diphenyl ether, 4,4'-bis(2-methoxy-3,4-epoxybutoxy) diphenyl dimethylmethane, 1,4-bis(2-methoxy-4,5-epoxypentoxy) benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include resorcinol, catechol, hydroquinone, methyl resorcinol, or polynuclear phenols, such as 2,2-bis(4-hydroxyphenyl) propane (Bisphenol A), 2,2-bis(4-hydroxyphenyl) butane, 4,4'-dihydroxybenzophenone, bis(4-hydroxyphenyl) ethane, 2,2-bis(4-hydroxyphenyl) pentane, and 1,5-dihydroxynaphthalene. The halogen-containing epoxides may be further exemplified by 3-chloro-1,2-epoxybutane, 2-bromo-1,2-epoxyhexane, 3-chloro-1,2-epoxyoctane, and the like. The polyepoxide polymeric products of this invention may be represented by the general formula:

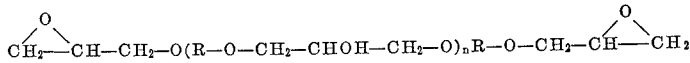

wherein R is a divalent hydrocarbon radical of the dihydric phenol and $n$ is an integer of the series 0, 1, 2, 3, etc.

The above-described preferred glycidyl polyethers of the dihydric phenols may be prepared by reacting the required proportions of the dihydic phenol and the epichlorohydrin in the presence of a caustic such as sodium hydroxide or potassium hydroxide to neutralize the hydrochloric acid formed during reaction. The reaction is preferably accomplished at temperatures within the range of from 50° C. to 150° C. The heating is continued for several hours to effect the reaction and the product is then washed free of salt and base.

Another group of polyepoxides that may be used comprises the glycidyl ethers of novolak resins, polynuclear polyhydroxy phenols, which are obtained by condensing an aldehyde with a polyhydric phenol in the presence of an acid catalyst. Further preparation of novolak resins is described in the book. Phenoplasts, 1947, p. 29 et seq., by T. S. Carswell. A typical member of this class is the epoxy resin from a condensate of formaldehyde and 2,2-bis(4-hydroxyphenyl) propane novolak resin.

A number of curing agents, activators or catalysts are known which harden unset polyepoxide resin. These include amines, dibasic acids and acid anhydrides. The preferred hardening agents are the amines, especially those having a plurality of amino hydrogen groups. Included are aliphatic, cycloaliphatic, aromatic or heterocyclic polyamines, such as diethylene triamine, ethylene diamine, triethylene tetramine, dimethylamino propylamine, diethylamino propylamine, piperidine, methane diamine, triethyl amine, benzyl dimethylamine, dimethylamino methyl phenol, tridimethyl amino methyl phenol, α-methylbenzyl dimethylamine, meta-xylene diamine, 4,4'-dimethylene dianiline, pyridine, and the like. Mixtures of various amines may be preferred. The amines or other curing agent react rather slowly to convert the polyepoxides to an insoluble form. The particular curing agent and concentration thereof can easily be determined by a knowledge of temperature conditions and available working time. i.e., length of time between adding the curing agent and final positioning of the resin-containing mixture downhole. Generally, the curing agent is added just prior to pumping the slurry into the well.

A typical polyepoxy resin, resin E, used in tests to be described later illustrating this invention was composed of the reaction product of epichlorohydrin and Bisphenol A using diethylenetriamine as the curing agent.

Liquid hydroxy aryl-aldehyde condensation products may also be used in this invention. Examples of suitable hydroxy aryl compounds include phenol, cresol, resorcinol, alpha naphthanol, salicyclic acid and similar low molecular weight phenolic materials having less than three carbon atoms in alkyl side chains, or mixtures thereof. Suitable aldehydes are formaldehyde, acetaldehyde, butyraldehyde, furfural, and other low molecular weight water-soluble aldehydes. The most widely used combination is the well known phenol-formaldehyde. Such resins may be prepared conventionally by reacting aqueous mixtures of the hydroxy aryl compound and aldehyde, in a known manner, under the influence of basic catalysis. Especially convenient for field use is the preparation of two partially condensed liquid mixtures, one of which mixtures is high in the hydroxy aryl component with a small proportion of aldehyde, while the other mixture is high in the aldehyde component with a small proportion of hydroxy aryl compound. These mixtures have a storage life of several weeks. When it is desired to use the plastic, the two mixtures are combined to give a liquid resin composition of the desired hydroxy aryl-aldehyde ratio. The setting time can be further accelerated through the use of catalysts such as bases or acids. The so-called resol resins have a molar excess of formaldehyde and are generally base catalyzed. The so-called novolak resins contain a molar excess of phenol and are generally acid catalyzed.

Two partially condensed liquid hydroxy aryl-formaldehyde mixtures were prepared as follows:

Resin A.—In a suitable container were mixed together 195 pounds of phenol, 205 pounds resorcinol, 253 pounds of a 37-percent by weight aqueous formaldehyde solution and 25 pounds of a 50-percent aqueous solution of sodium hydroxide. The mixture was held at about 175° F. for about 2.5 hours, allowing the phenol, resorcinol and formaldehyde to partially react together. The so-obtained reaction mass was then mixed with about 3.2 gallons of 32-percent aqueous hydrochloric acid solution to lower the pH to between 4 and 6. As the acid was added, the mixture stratified. The upper layer, which constituted about 38 percent of the total volume was largely salt water and was discarded after allowing the reaction mass to cool to room temperature. The lower layer comprised a slightly acid, partially condensed aqueous phenol formaldehyde polyhydroxy benzene liquid resin. It had a viscosity of about 150 cps. and a density of about 10.2 pounds per gallon.

Resin B.—The other of the two liquid plastics was made by mixing together 558 pounds of cryslic acid, 534 pounds of a 37-percent aqueous formaldehyde solution, 267 pounds of paraformaldehyde and 33.5 pounds of a 50-percent aqueous sodium hydroxide solution. The mixture was heated to a temperature of 125° F. and maintained at this temperature until the mixture became clear. This clarification took place usually in about 30 minutes. To the product thus obtained was added 15 gallons of a 15-percent hydrochloric acid solution. The addition of the acid brought about the formation of two liquid phases which stratified into two layers. The upper layer, consisting largely of water, was discarded. The remaining lower layer was heated to 175° F. for from 1 to 1.5 hours so as to bring the viscosity as measured at 80° F. to about 200 cps. The resulting liquid plastic had a pH between 3.7 and 4.3 and a density of 9.5 pounds per gallon. The amount obtained was about 102 gallons.

Resin C.—When ready for use, Resins A and B are mixed together in equal volumes to form Resin C which is injected into the well.

Resin D.—This is a single component hydroxy aryl-aldehyde resin prepared by reacting together at 60 to 70° C. 500 grams phenol, 40 grams 37-percent aqueous solution of formaldehyde and 25 grams sodium hydroxide dissolved in 25 grams water until the formaldehyde was fully combined. To this mixture was added 50 grams resorcinol and 50 grams 37-percent aqueous solution of formaldehyde. The resulting mixture was refluxed and dehydrated under vacuum to a viscosity of 3200 cps. The resin was then mixed with furfuryl alcohol in a ratio of 1 to 2 parts by volume to form Resin D.

Other types of resin which may be utilized include the polyesters which are formed from interaction of unsaturated polyhydroxyalcohols with unsaturated di- or polycarboxylic acids. Polyester type resins are cured by a combination of an organic peroxide and cobalt naphthenate, such as a combination of benzoyl peroxide or methyl ethyl ketone peroxide and cobalt naphthenate.

It has long been the practice to use various vehicles or carrying agents to transport well treating materials into a well. For plastic compositions, it is common to use petroleum oil for this purpose. These carrying agents are generally crude oil, diesel oil, kerosine or similar convenient inexpensive hydrocarbon material. The resin protective agents of this invention may also be broadly classified as petroleum oils. They also incidentally serve to carry well treating materials into wells. However, they possess other properties that distinguish them from the carrying agents known in the art.

In order for a resin protective agent to function to keep a resin or resin coated sand from being contaminated by water where the resin-containing composition is positioned in or adjacent a formation containing water, it is necessary that the density of the resin protective agent and the density of the resin be so related that water will not separate them when the three fluids are in contact. Many resins used in consolidating incompetent formations have a density of more than 1 g./cc. In these cases it has been found that the resin protective agent must have a density of more than about 0.85 g./cc. and preferably more than about 1.0 g./cc. Thus, water will float on top of the mixture of resin and resin protective agent. Resin protective agents having a density of from 0.85 g./cc. and 1.0 g./cc. apparently work because they have a greater affinity for the resin than water and will remain in contact with the resin rather than strip away and float on top of the water. The resin protective agent may also have a density far greater than 1.0 g./cc. when used with a resin of density greater than 1.0 g./cc. With other resins having a density of less than 1.0 g./cc. the density of the resin protective agent must be less than about 1.15 g./cc., and preferably less than 1.0 g./cc. Thus, the mixture of resin and resin protective agent will float on top of any water that might be present. In summary, the density of the resin protective agent must be 0.85 g./cc. or above if the density of the resin is more than 1.0 g./cc., and the density of the resin protective agent must be 1.15 g./cc. or below if the density of the resin is less than 1.0 g./cc. in order to keep any water present from contacting and diluting the resin.

However, as will be pointed out by later examples, the density requirement alone is not sufficient to identify a resin protective agent, as many organic materials having the proper density will not function as resin protective agents. A second requirement is that the resin protective agent must have an appreciable aromatic content. In general, it has been found that materials with an aromatic content of from about 8 percent to 100 percent are satisfactory. The preferred range of aromatic content is 50 to 90 percent. An aromatic compound is one which contains an aromatic nucleus, i.e., a six carbon ring characteristic of benzene and related series or the condensed six-carbon rings of naphthalene, anthracene, phenanthrene, etc.

As mentioned above, the resin should also be substantially insoluble in the resin protective agent in order to achieve a set of satisfactory strength. It is preferred that the solubility be less than about 5 percent by weight.

One class of materials found particularly good as resin protective agents are thermal cracker bottoms from petroleum refining operations. Refining processes are highly complex with many varitions. Broadly speaking, crude oil is ordinarily first topped or skimmed, i.e., distilled at atmospheric pressure. The residue or topped crude is further reduced or processed either by thermal cracking or coking to produce gasoline and black fuel oils or coke, or by vacuum or steam distillation to produce lubricating oils and asphalts.

The purpose of the thermal cracker is to reform naphtha or heavy gasoline into lower boiling gasoline of higher octane number which comes off as the overhead. The residue from the thermal cracker is one material of use as a resin protective agent. This thermal cracker residue is also a type of fuel oil. Fuel oil is a broad term covering any oil used for the production of power and heat. Fuel oils may be distillates, residuals, certain crudes or blends. It is the residual fuel oils which have a high aromatic content which may be used as resin protective agents.

Thermal cracker residue A, used in tests to be described hereafter, has a mid point boiling point of 816° F., a density of 1.05 g./cc., a polyaromatic content of 90 percent, and an average molecular weight of 302. Thermal cracker residue B has a mid point boiling point of 850° F., a density of 1.11 g./cc., a polyaromatic content of 90 percent, and an average molecular weight of 252.

EXAMPLES 1 THROUGH 21

A series of tests were made in which 300 grams 40 to 60 mesh size Ottawa sand was coated with a resin containing a setting time accelerator and 0.2 cc. gamma aminopropyltriethoxy silane as a coupling agent to improve the bond strength between the sand and the resin. The resin coated sand was suspended in various materials tested as resin protective agents. The resulting slurry was then poured into a 946 cc. bottle containing 710 cc. water and allowed to cure at controlled temperatures for various times intervals. Cores of the set materials ⅞-inch in diameter and ⅞-inch long were then tested for crushing strength using a Tinius Olsen hydraulic type super "L" tensiometer and in some cases for permeability to kerosine. A list of test variables and results are given in the following table.

hyde resin and a polyepoxy resin, respectively. Example 7 shows a satisfactory set can be achieved using only one half as much resin. Examples 8 and 9 illustrate, as resin protective agents, another thermal cracker residue and a chlorinated aromatic hydrocarbon, respectively. Examples 10, 11 and 12 illustrate that three common aromatic hydrocarbons, i.e., benzene, toluene and xylene, are satisfactory resin protective agents even though their density is less that that of water and they are being used with a resin whose density is greater than water. In these tests some separation of the aromatic hydrocarbon to float on top of the water was observed. However, enough of these resin protective agents remained in contact with the resin so that there was no appreciable contamination by water during the time required for the resin to set. Examples 13 through 16 show that mixtures of a thermal cracker residue and a nonaromatic material, pale oil, may be used, but not pale oil alone. These tests were made to illustrate that resin protective agents having relatively low aromatic content, e.g., as low as 8 percent in the mixture used in Example 15, still give acceptable crushing strengths. Example 17 shows that nonaromatic diesel oil, often used as a carrying agent for well treating chemicals is not satisfactory as a resin protective agent. Examples 18 through 21 illustrate various high density organic materials which are not aromatic and which do not function as resin protective agents.

Additional tests, not shown, were made using conditions similar to Example 9, except that the resin coated sand system, was immersed in various aqueous media other than fresh water. A satisfactory product was obtained using sea water, 70 grams sodium chloride per liter water, 250 grams calcium chloride per liter water and 600 grams zinc chloride per liter water.

EXAMPLE 22

To illustrate that the resin protective agent may also be

TABLE

| Example | Resin Protective Agent (cc.) | Density RPA (g./cc.) | Resin (cc.) | Accelerator (cc.) | Curing Temp. (° F.) | Curing Time (days) | Crushing Strength (p.s.i.) | Permeability (darcys) |
|---|---|---|---|---|---|---|---|---|
| 1 | None | | 50D | 10 hypophosphorus acid | 160 | 3 | None | None |
| 2 | 125 Thermal cracker residue A. | 1.05 | 50D | do | 50 | 3 | 117 | 23.1 |
| 3 | do | 1.05 | 50D | 10 alkyl benzene sulfonic acid | 75 | 3 | 285 | 25.8 |
| 4 | do | 1.05 | 50D | 10 hypophosphorus acid | 160 | 3 | 1,490 | 23.1 |
| 5 | do | 1.05 | 50C | 3 25% aqueous solution NaOH. | 160 | 1 | 162 | 32.4 |
| 6 | do | 1.05 | 50E | 3 diethylenetriamine | 160 | 1 | 124 | 26.0 |
| 7 | do | 1.05 | 25D | 3 hypophosphorus acid | 160 | 1 | 753 | 32.6 |
| 8 | 125 Thermal cracker residue B. | 1.11 | 50D | 3 diethylenetriamine | 160 | 1 | 124 | 26.0 |
| 9 | 125 Tetrachlorobiphenyl hydrocarbon. | 1.445 | 50D | 5 hypophosphorus acid | 160 | 1 | 930 | (¹) |
| 10 | Benzene | 0.879 | 50D | 10 hypophosphorus acid | 140 | 1 | 996 | (¹) |
| 11 | Toluene | 0.866 | 50D | do | 140 | 1 | 877 | (¹) |
| 12 | Xylene | 0.874 | 50D | do | 140 | 1 | 2,690 | (¹) |
| 13 | 62.5 Pale oil No. 400, 62.5 Thermal cracker residue A. | 0.965 | 25D | 5 hypophosphorus acid | 160 | 1 | 1,596 | (¹) |
| 14 | 83.4 Pale oil No. 400, 41.6 Thermal cracker residue A. | 0.926 | 25D | do | 160 | 1 | 1,009 | (¹) |
| 15 | 114 Pale oil No. 400, 11 Thermal cracker residue A. | 0.885 | 25D | do | 160 | 1 | 500 | (¹) |
| 16 | 125 Pale oil No. 400 | 0.876 | 50D | do | 160 | 1 | <100 | (¹) |
| 17 | 125 Diesel oil | 0.845 | 50D | do | 160 | 1 | none | None |
| 18 | 125 Methyl alcohol | 1.33 | 50D | do | 160 | 1 | none | None |
| 19 | 125 Diethylene glycol | 1.13 | 50D | do | 160 | 3 | none | None |
| 20 | 125 Glycerine | 1.26 | 50D | do | 160 | 1 | none | None |
| 21 | 125 Chlorinated wax (40% combined chlorine by weight). | 1.4 | 25D | do | 160 | 1 | <100 | 32.3 |

¹ Not measured.

The results of these tests were as follows: In Example 1, without a resin protective agent, the hydroxy aryl-aldehyde resin was contaminated with water and did not set. Examples 2 through 4 show that with this same resin a set can be achieved at various temperatures using a thermal cracker residue as the resin protective agent. The next two tests, Examples 5 and 6, show a satisfactory product is obtained using the same resin protective agent with a two component partially condensed hydroxy aryl-aldeused in treatments where a resin is injected into a water wet incompetent formation, a ⅞-inch diameter tube 6 inches long was filled with clean Blackhawk E sand of 80–200 mesh size and saturated with water. This synthetic core was flushed with 180 cc. diesel oil.

A mixture of 12.5 cc. thermal cracker residue A, 12.5 cc. resin D, 25 cc. furfuryl alcohol, 1.5 cc. hypophosphurus acid and 0.2 cc. aminopropyltriethoxy silane was injected into the core. After curing for 24 hours at 120° F., the core had set and had a compressive strength of 7390 p.s.i.

Well treatment

A cased well in Bayou Blue Field, La., was drilled to a total depth of 2731 feet and filled with gravel to 2702 feet. This well had 4 perforations per foot between 2675 and 2683 feet and a bottom hole temperature of 145° F. Tubing extended down to 2605 feet with a packer in the annular space between the tubing and casing at 2589 feet. This well produced unconsolidated sand along with the fluids oil and water. Thus, the wellbore area was known to be contaminated with water. Previously, a conventional gravel pack had been made on the well. This treatment was unsuccessful as the well rapidly sanded up. The well was then given three successive plastic coated sand treatments in an attempt to shut off the flow of loose sand.

(a) In a ribbon blender having two 2100-gallon mixing tanks equipped with large paddles was mixed 3300 gallons No. 1 diesel fuel, 5000 pounds 40 to 60 mesh Ottawa sand, 60 gallons of a mixture of 20 gallons resin D and 40 gallons furfuryl alcohol solvent and 0.625 gallon aminopropyltriethoxy silane coupling agent to improve the bond between the sand and resin. This mixture was thoroughly agitated for 5 minutes. Then 3 gallons hypophosphorus acid catalyst was blended in. The resulting 3612 gallons plastic coated sand slurry was pumped into the well and followed with an oil flush of sufficient volume to place the top of the plastic coated sand slurry just below the bottom of the tubing. The well was shut in for 24 hours. At this time there was an indication that the resin had not reached a satisfactory set. An attempt was made to flash set the resin by pumping into the well and through the slurry 672 gallons of a 2 percent by volume solution of trichloroacetic acid catalyst in diesel oil carrier. When the well was returned to production sand was again produced along with the well fluids, indicating an unsatisfactory job. Due to the unsatisfactory set of the resin, it was concluded that diesel oil was not satisfactory as a resin protective agent even though used in a large volume. The reason for the failure of the catalyst flush to flash set the resin is not entirely clear. Either the catalyst flush pushed the unset resin coated sand out of position and back into the formation thus exposing loose unconsolidated formation, or the resin was already so contaminated with water from the formation that a set could not be effected.

(b) The above procedure was repeated through the steps of placement of the treating composition in the well, using pale oil No. 400 as a resin protective agent and slightly different quantities of materials. Materials employed were 350 gallons pale oil No. 400, 4500 pounds 40 to 60 mesh Ottawa sand, 60 gallons of a mixture of 20 gallons resin D and 40 gallons furfuryl alcohol, 0.875 gallon aminopropyltriethoxy silane and 6 gallons hypophosphorus acid. The volume of the resulting slurry was 638.4 gallons. After placement of this slurry in the well, a pressure of 1000 p.s.i. was maintained on the well in an attempt to keep water from coming in and contaminating the resin. Following conventional procedures, the plug of resin coated sand in the wellbore below the tubing was drilled out 36 hours after placement. The cuttings obtained were soft, showing the resin had not set. The resin appeared to be water contaminated, e.g., was light in color compared to the hard set resin which resulted from a sample of the slurry retained at the surface and allowed to set at the same temperature as that existing in the well in the absence of water. It was concluded that encroaching water contaminated the resin and prevented a set. Thus, pale oil is not satisfactory as a resin protective agent. When returned to production the well again made appreciable quantities of sand, as well as oil and water.

(c) The above procedure was again repeated in the same well using thermal cracker residue A as the resin protective agent and slightly different quantities of materials. Materials employed were 400 gallons thermal cracker residue A, 4000 pounds 40 to 60 mesh Ottawa sand, 50 gallons of a mixture of 16⅔ gallons resin D and 33⅓ gallons furfuryl alcohol, 0.5 gallon aminopropyltriethoxy silane and 10 gallons hypophosphorus acid. The well was shut in for 24 hours following placement of the slurry. As above, the plug of resin coated sand in the wellbore below the tubing was drilled out. A total depth of 36 feet was drilled and consisted entirely of hardened resin coated sand. One week after the well was returned to service the production was 40 barrels oil per day and 80 barrels water per day with no sand. After two months, the well was producing 100 barrels water per day and no oil, but still no sand. The conclusion from this test was that thermal cracker residue A was a highly satisfactory resin protective agent as the resin set up as desired in a well having a large amount of water in the surrounding formation.

Throughout the foregoing specification, percent refers to percent by weight.

All compositions shown in the foregoing examples contained gamma aminopropyltriethoxy silane as a coupling agent to improve the bond strength between the solid particulate material and the resin. This coupling agent, while of value, is not essential to the practice of this invention.

From the foregoing description of the invention, it will be obvious to those skilled in the art that many variations and modifications may be made in the processes of this invention without departing from the spirit and scope thereof.

What is claimed is:

1. A method of treating a well penetrating an incompetent subterranean formation which contains water comprising injecting into the wellbore area a liquid thermosetting resin having a density of more than 1 gram per cc. suspended in a liquid organic resin protective agent containing from 9 to 100 percent by weight aromatic material and having a density of more than 0.85 gram per cc.

2. The method of claim 1 wherein the suspension also contains a solid particulate material.

3. The method of claim 2 wherein the solid particulate material is sand.

4. In the method of treating a well penetrating an incompetent subterranean formation containing water whereby a resin coated particulate solid material is positioned in the wellbore area and allowed to set to form a fluid permeable, formation particle-impermeable barrier, the improvement of slurrying the resin coated particulate solids in a liquid organic resin protective agent having a density of more than 0.85 gram per cc., an aromatic content of from 9 to 100 percent by weight, and in which the resin is substantially insoluble.

5. The method of claim 4 wherein the resin protective agent is thermal cracker residue.

6. The method of claim 4 wherein the resin protective agent is a chlorinated aromatic hydrocarbon.

7. A well treating composition comprising a liquid thermoplastic resin and at least an equal quantity of a liquid organic resin protective agent having a density of more than 0.85 gram per cc., an aromatic content of from 9 to 100 percent by weight, and in which the resin is substantially insoluble.

8. The composition of claim 7 wherein the liquid thermoplastic resin is a hydroxy aryl-aldehyde resin.

9. The composition of claim 7 wherein the resin protective agent is a thermal cracker residue.

10. The composition of claim 7 wherein the resin protective agent is a chlorinated aromatic hydrocarbon.

11. A method of treating a well penetrating an incompetent subterranean formation which contains water comprising injecting into the wellbore area a liquid thermosetting resin having a density of more than 1 gram per cc.

suspended in a liquid organic resin protective agent comprising a thermal cracker residue.

12. A method of treating a well penetrating an incompetent subterranean formation which contains water comprising injecting into the wellbore area a liquid thermosetting resin having a density of more than 1 gram per cc. suspended in a liquid organic resin protective agent comprising a chlorinated aromatic hydrocarbon.

13. A method of treating a well penetrating an incompetent subterranean formation which contains water comprising injecting into the wellbore area a liquid thermosetting resin having a density of more than 1 gram per cc. suspended in a liquid organic resin protective agent having an aromatic content of from 9 to 100 percent by weight, the density of said resin and the density of said resin protective agent being so related that water will not separate them when the three fluids are in content.

References Cited

UNITED STATES PATENTS

| | | | |
|---|---|---|---|
| 2,770,306 | 11/1956 | Clark | 166—33 |
| 2,815,815 | 12/1957 | Hower et al. | 166—33 |
| 2,823,753 | 2/1958 | Henderson et al. | 166—33 X |
| 2,986,534 | 5/1961 | Nesbitt et al. | 166—33 X |

FOREIGN PATENTS 928,127  6/1963  Great Britain.

OTHER REFERENCES

The Condensed Chemical Dictionary (p. 871), 6th edition, Reinhold Publishing Corp., New York (1961).

STEPHEN J. NOVOSAD, *Primary Examiner.*

UNITED STATES PATENT OFFICE
CERTIFICATE OF CORRECTION

Patent No. 3,391,738                        July 9, 1968

Derry D. Sparlin

It is certified that error appears in the above identified patent and that said Letters Patent are hereby corrected as shown below:

Column 1, lines 15, 20, 21 and 23, Column 3, line 12, and column 10, lines 60 and 66, "thermoplastic", each occurrence, should read -- thermosetting --.

Signed and sealed this 31st day of March 1970.

(SEAL)
Attest:

Edward M. Fletcher, Jr.
Attesting Officer

WILLIAM E. SCHUYLER, JR.
Commissioner of Patents